United States Patent [19]

Woerner et al.

[11] Patent Number: 4,714,449
[45] Date of Patent: Dec. 22, 1987

[54] APPARATUS FOR REDUCING VEHICLE DRIVE TRAIN VIBRATIONS

[75] Inventors: Guenter Woerner, Kernen; Ernst Tscheplak, Weinstadt; Franz Moser, Wendlingen, all of Fed. Rep. of Germany

[73] Assignee: Daimler-Benz Aktiengesellschaft, Stuttgart, Fed. Rep. of Germany

[21] Appl. No.: 870,346

[22] Filed: Jun. 4, 1986

[30] Foreign Application Priority Data

Jun. 4, 1985 [DE] Fed. Rep. of Germany ....... 3519912

[51] Int. Cl.$^4$ ..................... F16D 13/60; F16F 15/12
[52] U.S. Cl. ................................. 464/68; 74/574; 192/106.2; 464/46
[58] Field of Search ........... 74/574; 192/30 V, 110 B, 192/106.1, 106.2; 464/66, 67, 68, 30, 45, 46

[56] References Cited

U.S. PATENT DOCUMENTS 4,274,524  6/1981  Nakane .............................. 464/68 X
4,611,701  9/1986  Friedmann ....................... 192/110 B

FOREIGN PATENT DOCUMENTS 1962963  6/1971  Fed. Rep. of Germany ... 192/106.2
3411091  5/1985  Fed. Rep. of Germany ........ 464/66
3411092  5/1985  Fed. Rep. of Germany ........ 464/66
2153970  8/1985  United Kingdom ............. 192/106.2

Primary Examiner—Daniel P. Stodola
Attorney, Agent, or Firm—Barnes & Thornburg

[57] ABSTRACT

An apparatus for reducing the transmission of vibrations from an engine to a transmission line having a divided flywheel with first and second flywheel elements is provided by the in which the two flywheels are connected to the engine and transmission line, and are respectively connected by a spring mounting and at least two frictional clutches positioned between the two flywheels. The second frictional clutch has frictional contact smaller than the maximum torque of the engine and relative movements between the flywheel elements are effectively damped when the forces acting between the flywheel elements in these relative movements are weaker than the maximum engine torque, but stronger than a predetermined threshold value.

10 Claims, 5 Drawing Figures

FIG.3

APPARATUS FOR REDUCING VEHICLE DRIVE TRAIN VIBRATIONS

BACKGROUND OF THE INVENTION

The present invention relates to an apparatus for reducing the transmission of vibrations from an engine to a transmission line. The apparatus includes a divided flywheel, having first and second flywheel elements. The first flywheel element is drivingly connected to the engine and the second is drivingly connected to the transmission line. The two flywheel elements are drivingly connected together by resilient means between the flywheel elements.

Such an apparatus is the subject matter of an earlier filed U.S. patent application (Ser. No. 829,508) owned in common with the present invention. An advantage of this arrangement is that a good degree of comfort can be achieved. During the resonant range of the transmission line, the flywheel elements execute comparatively large displacements relative to one another. The forces acting between the device or flywheel elements, which are transmitted via the spring mounting, exceed the strength of the frictional contact when operation takes place over a prolonged period at or near the resonant frequency. Since the drive system is designed such that the resonant frequency lies somewhat below the idling speed of the engine, a longer lasting excitation of the resonant frequency can occur in the case of repeated starting attempts. By setting the frictional contact to be relatively weak, the relative movements of the flywheel elements can be retarded, and thus damped, along a comparatively large travel distance.

However, as long as the forces transmitted between the device or flywheel elements by the spring mounting are lower than the strength of the frictional contact forces, the spring mounting cannot exert any damping effect. This is desirable for relatively small-displacement vibrations that occur between the device or flywheel elements at higher speeds of the engine and under substantially stationary operating conditions—in travel at constant speed, for example. However, there are situations in which larger relative movements between the device or flywheel elements can occur outside the resonant frequency of the drive line, such as in the load change between coasting and drive of a vehicle. Since the forces occurring in such a load change are often less than the strength of the frictional contact forces, a damping of the vibrations associated with the load change is not readily possible It is therefore an object of the present invention to provide an apparatus of the initially-mentioned type in which the relative movements occurring between the device or flywheel elements are already effectively damped when the forces acting between the device and the flywheel elements in these relative movements are weaker than the maximum engine torque, but stronger than a predetermined threshold value.

This object and other objects are achieved by providing an apparatus of the above-described type with first and second clutches positioned between the flywheels. The second frictional clutch has frictional contact smaller than the maximum torque of the engine. In certain preferred embodiments, the first clutch is affected by clearance while the second clutch is not affected by clearance.

Consequently, the second clutch can slip even at relatively low transmitted torques until, after using up the clearance, the first clutch also slips provided the moments acting between the device or flywheel elements are adequately large, i.e. exceed the maximum engine torque. The maximum engine torque is a predetermined maximum rated engine torque for the particular engine.

Among other things, one advantage of the present invention is that unavoidable tolerances with regard to the strength of the frictional contact of the two clutches do not lead to any noticeably different behavior of the apparatus. This means that unavoidable ageing processes are also insignificant, like the divergence in production. It merely needs to be ensured that the strength of the frictional contact of the two clutches, i.e. the sum of strength of the frictional contact of the first clutch and the strength of the frictional contact of the second clutch, is greater than the maximum engine torque, while at the same time the frictional contact of the second clutch has a smaller strength than this engine torque.

According to a certain preferred embodiment of the invention, an additional third clutch is provided which is affected by clearance, to be arranged between an abutment part and the other device or flywheel element, parallel to the spring mounting. The strength of the frictional contact of this third clutch is smaller than the maximum engine torque, at least when the speeds are above the resonant frequency.

Moreover, in certain preferred embodiments, there may be provision for the second clutch and/or the third clutch to be arranged with speed-dependent frictional contact, by designing in the manner of a centrifugal clutch, for example. With this provision, the frictional contact of the second clutch can increase with increasing engine speed while the frictional contact of the third clutch can decrease with increasing engine speed. In this arrangement, the mobility given by the spring mounting between the device or flywheel elements at high speeds, at which only small vibrational amplitudes occur, is damped only slightly or not at all, while at low speed, and in particular within the resonant range at very low speed, an increased damping through friction occurs.

Further objects, features, and advantages of the present invention will become more apparent from the following description when taken with the accompanying drawings, which show for purposes of illustration only, an embodiment constructed in accordance with the present invention.

DETAILED DESCRIPTION OF THE DRAWINGS

Figure 1:
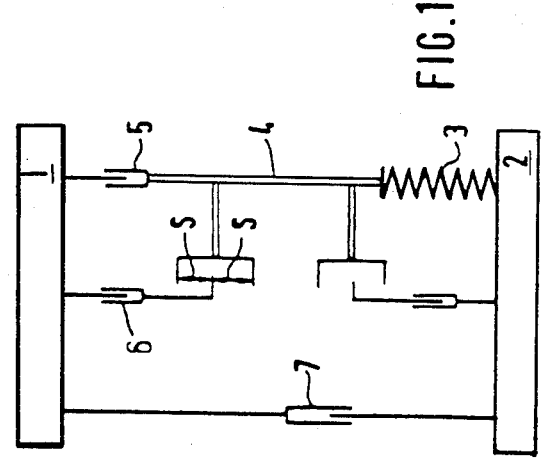
FIG. 1 is a schematic representation of the split flywheel constructed in accordance with a preferred embodiment of the invention.

In FIG. 1, the two flywheel elements 1 and 2 are shown schematically as heavy bodies which are supported or coupled relative to one another by means of a spring mounting 3. The one abutment of the spring mounting is arranged on the flywheel element 2, while the other abutment is formed by an abutment part 4. This abutment part 4 is connected to the flywheel element 1 via a slip clutch 5 arranged in series with the spring mounting 3, and permits the flywheel elements 1 and 2 to displace, i.e. rotate, relative to one another to any extent if an appropriately high torque occurs between these two elements. The slip clutch 5 is, at least substantially, free of clearance.

The abutment part 4 is further connected to the flywheel element 1 via a slip clutch 6, affected by clearance, which in each cas can only act when a clearance of total length 2 S has been used up.

The strength of the frictional contact of the two slip clutches 5 and 6 arranged in parallel to one another is greater in total than the maximum torque of the engine. The frictional contact of the slip clutch 5 alone is, however, smaller than this torque.

Moreover, the flywheel elements 1 and 2 can be coupled directly to one another in weak frictional contact by means of a third slip clutch 7. Often, the slip clutch 7 can even be dispensed with, because an unavoidable frictional resistance inevitably acts as a weak frictional contact between the flywheel elements 1 and 2.

In actual operation, the flywheel elements 1 and 2 will rotate relative to one another, which in FIG. 1 is schematically represented by an axial approach or withdrawal of the flywheel elements 1 and 2 towards or away from one another.

When only slight relative movements, i.e. vibrations of low amplitude, occur between the flywheel elements 1 and 2, the clearance 2 S available to the abutment part 4 with respect to the slip clutch 6 is not exhausted. Accordingly, only the spring mounting 3 and the slip clutch 5 are active between the flywheel elements 1 and 2, provided that the respective transmitted moment can still be taken by the slip clutch 6.

As soon as the moments acting between the flywheel elements 1 and 2 exceed the frictional contact of the slip clutch 5 to a sufficient extent or for a sufficient time, the clearance 2 S is used up, so that both slip clutches 5 and 6 operate or slip in parallel. This latter case occurs essentially only in the resonant range of the drive line, which is due to appropriate matching of the hardness of the spring mounting 3 and the masses of the flywheel elements 1 and 2 at very low speeds, which still lie below the idling speed of the engine and occur virtually only during starting of the engine.

A further example of the occurrence of increased moments between the flywheel elements 1 and 2 is the so-called jump start, which occurs when a clutch arranged between engine and drive line is closed in shock-like manner.

Figure 2:
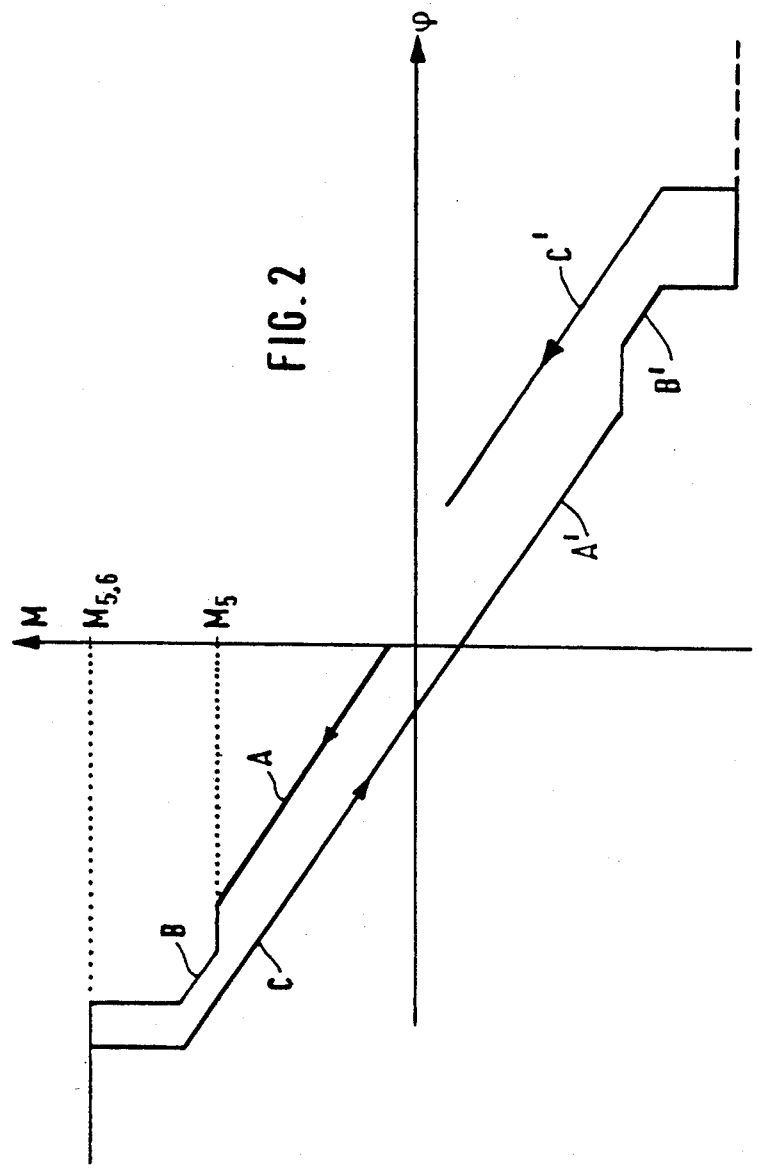
FIG. 2 is a diagram showing the dependency between the torques (M), be overcome between the flywheel elements, as a function of the relative deflection ($\phi$) of the flywheel elements to one another.

The diagram in FIG. 2 shows in detail the functional mode of the flywheel shown in FIG. 1. In this diagram, the torque M active or transmitted between the flywheel elements 1 and 2 is shown as a function of the displacement or rotation $\phi$ of the flywheel elements 1 and 2 relative to one another.

Assume the flywheel to be located in the center position shown in FIG. 1. If the flywheel elements 1 and 2 are now to be rotated relative to one another—for example in an approach direction in the schematic representation in FIG. 1—a certain minimum moment must be applied which is given by the pretension of the spring mounting 3. An increasing moment against further rotation is then set up by the spring mounting 3 according to the curve section A. As soon as a moment become effective between the flywheel elements 1 and 2 which approximately corresponds to the moment $M_5$ which can be transmitted by the slip clutch 5, the slip clutch 5 slips along a travel distance S (cf. FIG. 1), so that the slip clutch 6 also becomes effective. Consequently, the spring 3 is increasingly tensioned, according to graph section B in further rotation, until the maximum spring mounting displacement between flywheel element 2 and abutment part 4 has been used up. If, at the same time, the torque acting between the flywheel elements is greater than a value $M_{5,6}$ which corresponds to the sum of the moment which can be transmitted by the slip clutch 5 and the moment which can be transmitted by the slip clutch 6, both slip clutches 5 and 6 slip, and the flywheel elements 1 and 2 are displaced relative to one another by a correspondingly large angle.

As soon as the relative movement of the flywheel elements 1 and 2 in the direction described above has come to a standstill, the spring mounting attempts to return the two flywheel elements 1 and 2 according to graph section C.

When displacing the flywheel elements 1 and 2 relative to one another in the reverse direction by means of moments acting between the flywheel elements 1 and 2, the above description applies analogously. Consequently, sections corresponding to sections A, B and C are denoted A', B' and C'.

Figure 3:
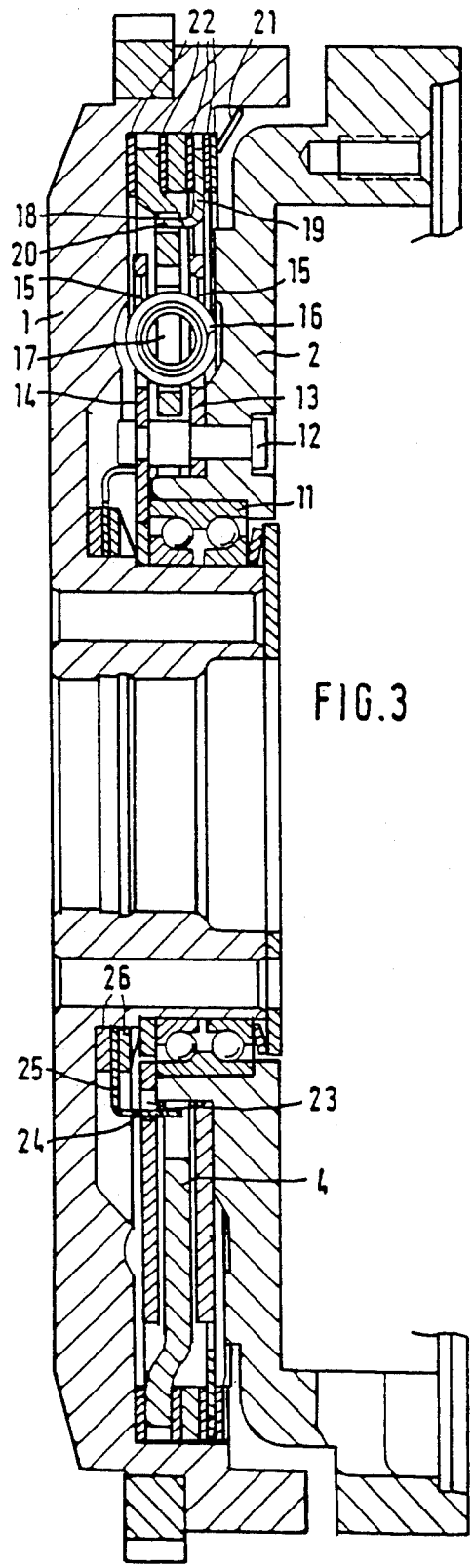
FIG. 3 is an axial sectional view of a first preferred embodiment of the present invention constructed in accordance with the arrangement of FIG. 1.

FIG. 3 then shows an axial section of a first preferred embodiment of the two-piece flywheel according to the invention, in which the design principle schematically shown in FIG. 1 has been effected.

The flywheel element 1 is connected in a driven manner to the engine (not shown). The flywheel element 2 is rotatably mounted on the flywheel 1 by means of a bearing arrangement 11 and can be connected in a driven manner by a clutch (not shown) to the input shaft of a drive line or a vehicle transmission (also not shown).

Two annular discs 13 and 14 are fixed at an axial distance from one another on the flywheel element 2 by means of studs 12. These annular discs 13 and 14 have several apertures or windows 15 which extend approximately tangentially to the axis of the flywheel elements 1 and 2 and serve as a cage-like guidance for helical springs 16. The diameter of the apertures or windows 15 is greater than the axial distance between the annular discs 13 and 14 and, also, the size of the apertures or windows 15 in radial direction. Moreover, the helical springs 16 are inserted with pretension into the windows 15, so that the front ends of the helical springs 16 are loaded against the facing edges of the windows 15.

Axially arranged between the annular discs 13 and 14 is the abutment part 4 (cf. also FIG. 1), which is designed as a disc-shaped annular part and, for accommodating the helical springs 16, has windows 17 corresponding to the windows 15 of the annular discs 13 and 14. If the windows 15 and 17 are therefore in alignment with one another—in axial view of the flywheel—the helical springs 16 are relieved to maximum extent. On the other hand, if the abutment part 4 is rotated relative to the annular discs 13 and 14 and thus relative to the flywheel element 2, the springs 16 are pressed together to an increasing extent between one edge of the windows 17 and the opposite edges of the windows 15. In the area of the studs 12, the abutment part 4 has recesses extending sufficiently in peripheral direction so that the abutment part 4 can rotate relative to the annular discs 13 and 14.

The abutment part 4, shaped like an annular disc, projects outwards beyond the annular discs 13 and 14 in radial direction and has, radially outside the annular discs 13 and 14, openings 18 extended in peripheral direction, into which a disc-shaped annular part 19 engages with lug-shaped bent-off portions 20. The bent-off portions 20 have, within the openings 18 in peripheral direction, a clearance of total length 2 S (cf. FIG. 1) available, such that abutment part 4 and annular part 19 can be rotated relative to one another corresponding to this clearance.

The radially outer edges of abutment part 4 and annular part 19 are frictionally clamped by means of a spring ring 21, active in axial direction of the flywheel elements 1 and 2, between friction laminae 22 which are arranged non-rotatably relative to the flywheel element 1. This arrangement allows a maximum torque $M_5$ to be transmitted between the abutment part 4 and the flywheel element 1 and a maximum torque $M_6$ to be transmitted between the annular part 19 and the flywheel element. Thus, if after using up the clearance for the bent-off portions 20 in the openings 18, abutment part 4 and annular part 19 are rotated jointly relative to the flywheel element 1, altogether a torque $M_5+M_6=M_{5,6}$ can be transmitted.

The frictional contact between the friction laminae 22 and the abutment part 4 and the annular part 19, respectively, is to be apportioned such that $M_{5,6}$ is greater than the maximum engine torque, while at least $M_5$ is smaller than this torque.

In the annular disc 14, in preferred embodiments, there may also be openings 23 extended in peripheral direction, into which the lug-like bent-off portions 24 of an annular part 25 engage with clearance in peripheral direction. This annular part 25 is frictionally coupled via friction laminae 26 to the flywheel elements 1, so that when the clearance of the bent-off portions 24 in the openings 23 have been used up, the flywheel elements 1 and 2 are directly frictionally coupled to one another. This direct clutch which is affected by clearance and is active between the flywheel elements 1 and 2 may, however, be dispensed with to achieve an arrangement which is as simple as possible.

Figure 4:
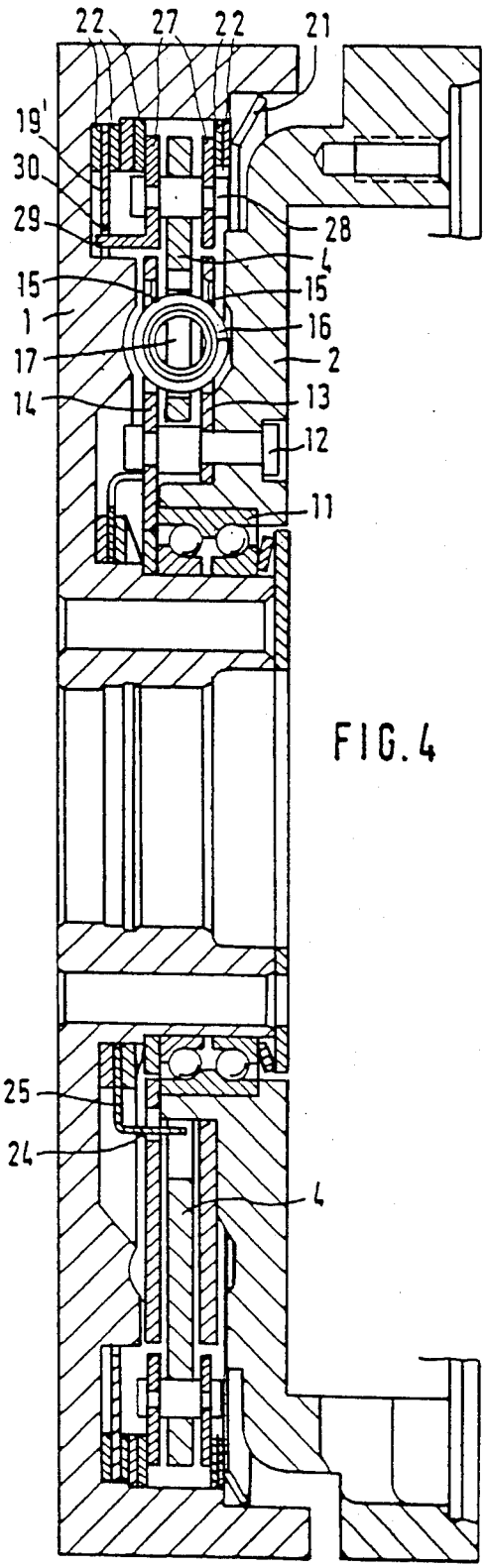
FIG. 4 is an axial sectional view of a second preferred embodiment of the present invention constructed in accordance with the arrangement of FIG. 1.
Figure 5:
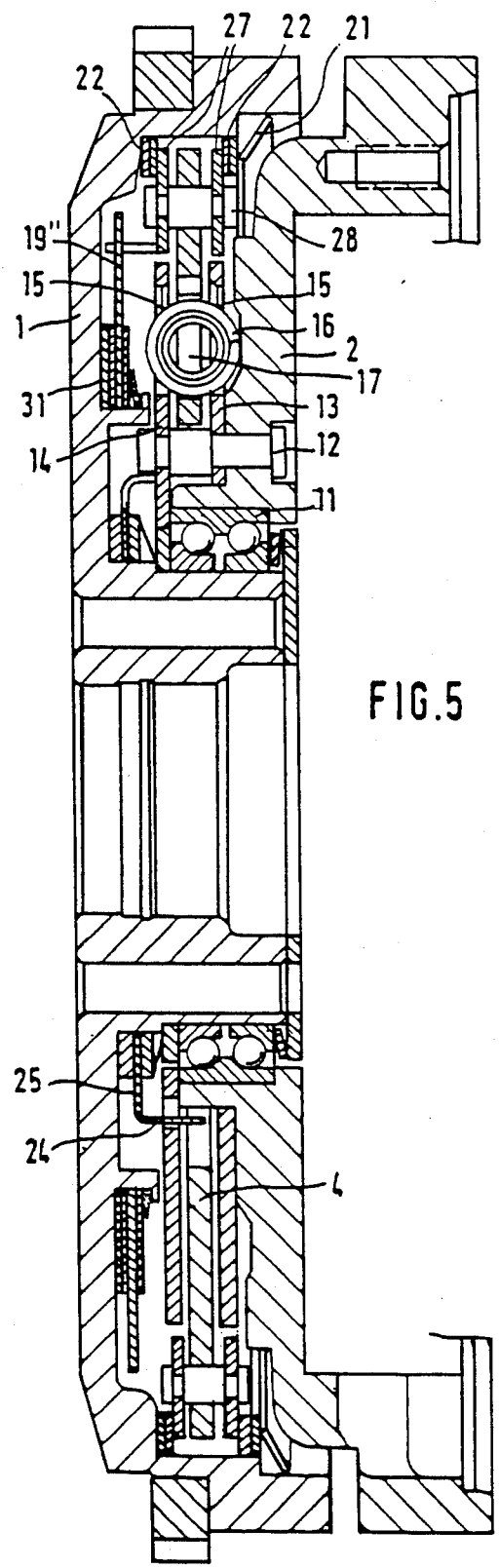
FIG. 5 is an axial sectional view of a third preferred embodiment of the present invention constructed in accordance with the arrangement of FIG. 1.

In the embodiments illustrated in FIGS. 3, 4, and 5: slip clutch 5 of FIG. 1 corresponds to abutment part 4 and friction laminae 22 (and rings 27 in FIGS. 4 and 5); slip clutch 6 of FIG. 1 corresponds to annular part 19 and friction laminae 22 (friction laminae 31 in FIG. 5); and slip clutch 7 of FIG. 1 corresponds to annular part 25 and friction laminae 26; and the spring mounting 3 of FIG. 1 corresponds to abutment 4, discs 13 and 14, and helical spring 16.

The arrangement according to FIG. 4 differs from that according to FIG. 3 in that disc-shaped rings 27 are non-rotatably arranged by means of pins 28 on either face of the abutment part 4 which is shaped like an annular disc. One of the rings 27 engages with lug-shaped bent-off portions 29 in recesses 30, which are arranged and extend in peripheral direction on the annular part 19' such that the bent-off portions 29 have a total clearance 2 S available in the recesses 30. Furthermore, as shown in the embodiment of FIG. 4, the abutment part 4 is frictionally connected by means of its disc-shaped rings 27 to the friction laminae 22.

The embodiment illustrated in FIG. 5 differs from that of FIG. 4 in that the annular part 19' is frictionally coupled at its radially inner edge region via friction laminae 31 to the flywheel element 1, while the friction laminae 22 exclusively serve for the frictional clutch between the rings 27 of the abutment part 4 and the flywheel element 1.

Although the present invention has been described and illustrated in detail, it is to be clearly understood that the same is by way of illustration and example only, and is not be be taken by way of limitation. The spirit and scope of the present invention are to be limited only by the terms of the appended claims.

We claim:

1. Apparatus for reducing the transmission of vibrations from an engine to a transmission line, comprising:
   a divided flywheel having first and second flywheel elements, one said element being drivingly connected to said engine and the other said element being drivingly connected to said transmission line;
   spring mounting means for drivingly coupling said first and second flywheel elements;
   first abutment means connected to said first flywheel element for abutting said spring mounting means;
   second abutment means connected to said second flywheel element for abutting said spring mounting means;
   first slip clutch means for providing a first frictional connection between said first abutment means and said first flywheel element, said first slip clutch means permitting relative rotation between said flywheel elements in response to forces above a first predetermined threshold level;
   second slip clutch means for providing a second frictional connection between said first abutment means and said first flywheel element, said second slip clutch means frictionally connecting said flywheel elements only after a threshold relative displacement between said flywheel elements is exceeded;
   wherein said first frictional connection is below a maximum torque of said engine and a sum of said first and second frictional connections is greater than said maximum torque of said engine.

2. Apparatus according to claim 1, wherein frictional contact forces at said first clutch means increase with increasing speed.

3. Apparatus according to claim 1, wherein said first and second clutch means operate in parallel to one another.

4. Apparatus according to claim 1, further including third clutch means for providing a third frictional connection, said third frictional connection being smaller than the engine torque.

5. Apparatus according to claim 4, wherein said third frictional connection of the third clutch means decreases with increasing engine speed.

6. Apparatus according to claim 5, wherein said third clutch means provides said third frictional connection only after a second threshold relative displacement between said flywheel elements is exceeded.

7. Apparatus according to claim 6, wherein said third clutch means is between said first abutment means and said second flywheel element and parallel to said spring mounting.

8. Apparatus according to claim 1, wherein said first abutment means incudes an annular disc arrangement which is frictionally coupled at a radially outer edge to said first flywheel element and is connected with clearance in peripheral direction to an annular part which is also frictionally coupled to the first flywheel element.

9. Apparatus according to claim 8, further including common spring means for tensioning the annular disc arrangement and the annular part in axial direction against friction laminae on said first flywheel element.

10. Apparatus according to claim 8, further including separate spring means for tensioning the annular disc arrangement and the annular part respectively in axial direction against separate friction laminae on said first flywheel element.

* * * * *